United States Patent
Hsiao et al.

(10) Patent No.: US 9,400,328 B2
(45) Date of Patent: Jul. 26, 2016

(54) RADAR DEVICE FOR AN AUTOMOTIVE RADAR SYSTEM

(71) Applicant: Wistron NeWeb Corporation, Hsinchu (TW)

(72) Inventors: Hsin-Lung Hsiao, Hsinchu (TW); I-Shan Chen, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 332 days.

(21) Appl. No.: 13/970,585

(22) Filed: Aug. 19, 2013

(65) Prior Publication Data

US 2014/0313067 A1 Oct. 23, 2014

(30) Foreign Application Priority Data

Apr. 18, 2013 (TW) .............................. 102113821 A

(51) Int. Cl.
*G01S 13/93* (2006.01)
*G01S 13/42* (2006.01)
*G01S 13/87* (2006.01)

(52) U.S. Cl.
CPC .................. *G01S 13/42* (2013.01); *G01S 13/87* (2013.01); *G01S 13/931* (2013.01); *G01S 2013/9332* (2013.01); *G01S 2013/9378* (2013.01); *G01S 2013/9389* (2013.01)

(58) Field of Classification Search
CPC .......... G01S 13/931; G01S 2013/9375; G01S 2013/9389; G01S 13/87; G01S 13/42
USPC ........................................................ 342/70
See application file for complete search history.

(56) References Cited

U.S. PATENT DOCUMENTS

| | | | | |
|---|---|---|---|---|
| 5,034,747 A * | 7/1991 | Donahue | ............... | A42B 3/0433 2/410 |
| 7,498,970 B2 * | 3/2009 | Yoshida | ................ | G01S 13/931 342/70 |
| 7,663,533 B2 * | 2/2010 | Toennesen | ............... | G01S 13/48 342/154 |
| 8,044,845 B2 * | 10/2011 | Saunders | ................ | G01S 7/032 342/175 |
| 2005/0046606 A1 * | 3/2005 | Yoneda | ................. | G01S 13/878 342/70 |
| 2010/0097264 A1 * | 4/2010 | Kawasaki | ................ | H01Q 1/42 342/70 |
| 2010/0103023 A1 * | 4/2010 | Ogawa | .................... | G01S 7/023 342/59 |
| 2010/0271256 A1 * | 10/2010 | Tsunekawa | ......... | B60R 21/0134 342/70 |
| 2011/0163909 A1 * | 7/2011 | Jeong | .................. | G01S 13/4463 342/70 |
| 2011/0267217 A1 * | 11/2011 | Hildebrandt | ............ | G01S 7/032 342/70 |
| 2012/0194377 A1 * | 8/2012 | Yukumatsu | ........... | G01S 13/931 342/70 |
| 2014/0111370 A1 * | 4/2014 | Aleem | .................. | B60R 19/483 342/70 |

FOREIGN PATENT DOCUMENTS

CN 2899147 Y 5/2007

* cited by examiner

*Primary Examiner* — John B Sotomayor
*Assistant Examiner* — Marcus Windrich
(74) *Attorney, Agent, or Firm* — Winston Hsu; Scott Margo

(57) ABSTRACT

A radar device for an automotive radar system includes a base, a first antenna module including a first transmitting antenna and a plurality of first receiving antennas for emitting a detection signal and generating a first signal receiving result, wherein the first antenna is fixed on the base, a second antenna module including a second transmitting antenna and a plurality of second receiving antennas for emitting the detection signal and generating a second signal receiving result, wherein the second antenna is fixed on the base, and a control system disposed in the base and coupled to the first antenna module and the second antenna module for outputting the detection signal to the first transmitting antenna and the second antenna and processing the first signal receiving result and the second signal receiving result.

12 Claims, 13 Drawing Sheets

RADAR DEVICE FOR AN AUTOMOTIVE RADAR SYSTEM

BACKGROUND OF THE INVENTION

1. Field of the Invention

The present invention relates to a radar device for an automotive radar system, and more particularly, to a radar device capable of reducing required routing and simplifying an assembly procedure.

2. Description of the Prior Art

A blind spot detection system is a vehicle safety technology achieving advance warning by utilizing millimeter wave radar sensing technology, which detects obstacle conditions in blind spots of the vehicle by an image self-identification method of machine vision. If the system detects existence of a specific obstacle in the blind spot, a warning light or sound signal is proactively provided for the driver to determine a driving direction, so as to avoid traffic accidents due to negligence or blind spot of the driver. The conceptual operation diagram is shown in FIG. 1.

As shown in the FIG. 1, the dotted region on the rear left and right corners of a vehicle 100 is considered as the blind spots (i.e., the blind region). The conventional blind spot detection system disposes two wireless signal transceivers 100 inside the bumper for detecting the obstacles by transmitting and receiving of millimeter wave wireless signals. Note that, FIG. 1 is used to illustrate the operation concept of a blind spot detection system, so the relative positions of the wireless signal transceivers 12, 14 are labeled. Generally, the wireless signal transceivers 100, 102 are disposed inside the bumper so that they are hidden from perception. Moreover, FIG. 1 shows that the wireless signal transceivers 100, 102 are disposed on both corners of the rear bumper according to the positions of the blind regions 12, 14. In such a condition, the positions of the wireless signal transceivers 100, 102 need to be clarified and adjusted during installation, which causes an increase of the installation complexity.

In addition, each of the wireless signal transceivers 100, 102 includes three major portions: a digital signal processing (DSP), an electrical control unit (ECU), and a radio-frequency (RF) circuit. Since these circuits or units require complying with automotive specifications (e.g. temperature, vibration, etc.), the manufacturing cost cannot be effectively reduced, which even creates a barrier for popularizing the wireless signal transceivers to majority of the vehicles. Considering that the blind spot detection system helps to effectively reduce traffic accidents, the manufacturing cost of the blind spot detection system needs to be further reduced in order to increase the adoption rate, and therefore decrease social costs of traffic accidents.

Furthermore, the detection signals obtained from the wireless signal transceivers 100, 102 need to be transmitted to the electrical control unit inside the vehicle for timely generating the warning light or sound for the driver. In such a situation, since the wireless signal transceivers 100, 102 are disposed on both corners of the rear of the vehicle, the complexity of the signal routing is increased and a lot of assembling procedures are required. Therefore, reliability or satisfaction to the vehicle may become an issue.

On the other hand, since shock-absorbing Styrofoam or glass fiber is usually disposed inside the vehicle bumper, the available space is limited. Therefore, the blind spot detection system vendor needs to be involved into the decision loop of materials and thickness of the bumper during the vehicle design and iteratively modifies the wireless transceiver design in order to meet the requirement of the vehicle vendor. As a result, the timeliness is hard to achieve. In addition, if the automotive radar system is produced for sales of after-market, i.e. vendors for the radar systems are not able to participate in decision-making of materials and thickness of the bumper. In such a condition, it becomes much more difficult to design a blind spot detection system that complies with majority of the vehicles.

Thus, it is a common goal in the industry to effectively reduce the installation complexity and manufacturing cost of the blind spot detection system, and make the blind spot detection system applicable to the after-market.

SUMMARY OF THE INVENTION

The present invention therefore provides an automotive radar device capable of reducing required routing and simplifying the assembly procedure.

The present invention discloses a radar device used in an automotive radar system. The radar device includes a base; a first antenna module, including a first transmitting antenna and a plurality of first receiving antennas for transmitting a detection signal and generating a first signal receiving result, wherein the first antenna module is fixed on the base; a second antenna module, including a second transmitting antenna and a plurality of second receiving antennas for transmitting the detection signal and generating a second signal receiving result, wherein the second antenna module is fixed on the base; and a control system, disposed on the base and coupled to the first antenna module and the second antenna module for outputting the detection signal to the first transmitting antenna and the second transmitting antenna, and processing the first signal receiving result and the second signal receiving result.

The present invention further discloses a radar device for an automotive radar system including a plurality of antenna modules, each comprising a transmitting antenna and a plurality of receiving antennas for transmitting a detection signal and generating a signal receiving result; and a control system. The control system includes a radio-frequency (RF) processing module, for outputting the detection signal to the transmitting antenna of each antenna module and processing the signal receiving result generated by the plurality of receiving antennas of each antenna module; a switch module, coupled between the plurality of receiving antennas of each antenna module and the RF processing module, for switching the connection between the plurality of receiving antennas of each antenna module and the RF processing module; and a computation module, coupled to the RF processing module and the switch module for controlling the RF processing module to generate the detection signal to the plurality of antenna modules, receiving the plurality of signal receiving results processed by the RF processing module to determine an occurrence of a plurality of obstacles, and controlling the switch module to switch the connection sequentially between the plurality of receiving antennas of each antenna module and the RF processing module, such that only a plurality of receiving antennas of a single antenna module within the plurality of antenna modules are connected to the RF processing module at the same time.

These and other objectives of the present invention will no doubt become obvious to those of ordinary skill in the art after reading the following detailed description of the preferred embodiment that is illustrated in the various figures and drawings.

DETAILED DESCRIPTION

Figure 2A:
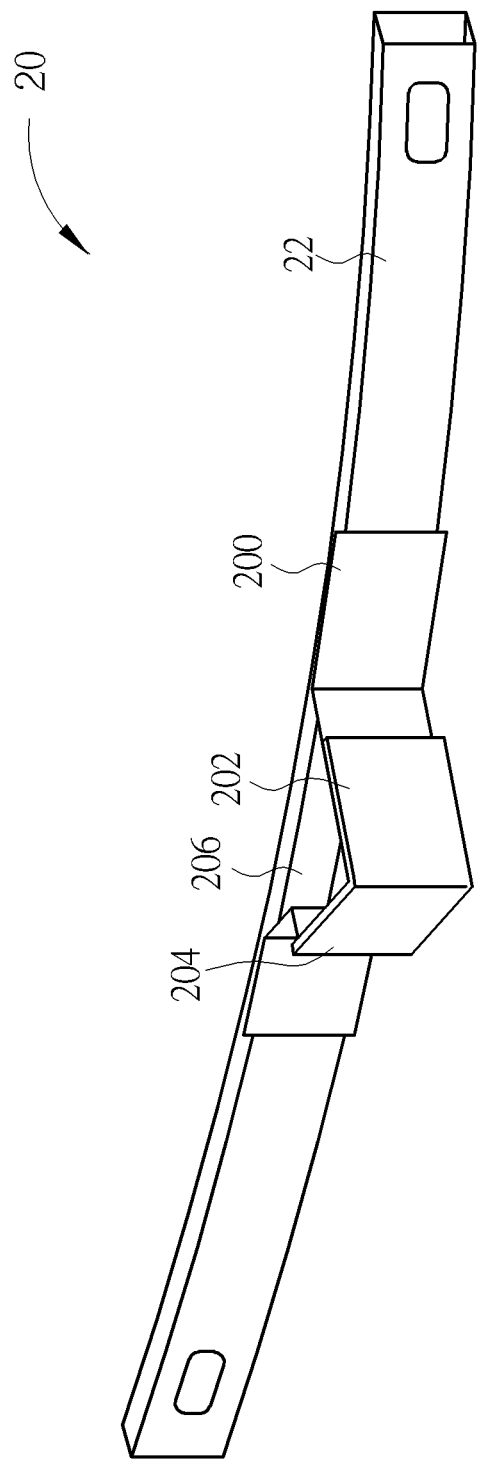
FIG. 2A is a schematic diagram of an appearance of a radar device according to an embodiment of the present invention.
Figure 2B:
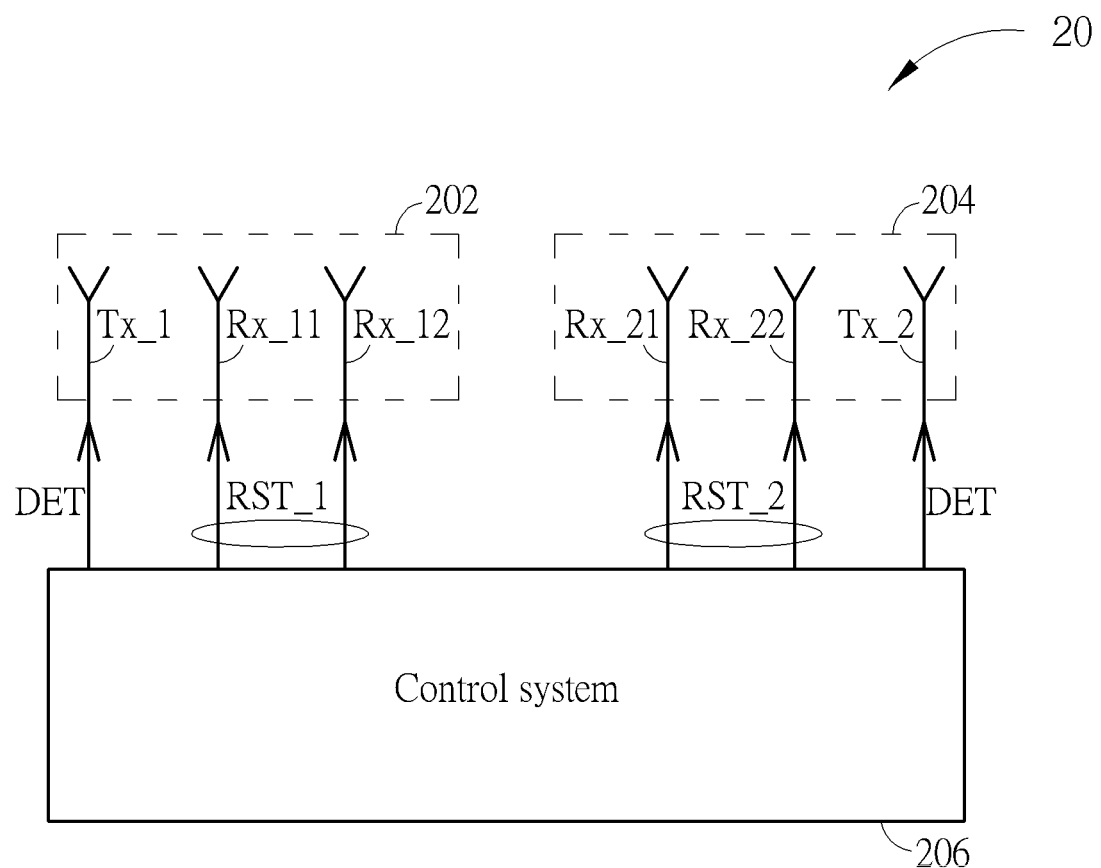
FIG. 2B is a functional block diagram of the radar device shown in FIG. 2A.

Please refer to FIG. 2A and FIG. 2B. FIG. 2A is a schematic diagram of an appearance of a radar device 20 according to an embodiment of the present invention, and FIG. 2B is a functional block diagram of the radar device 20. The radar device 20 is used in an automotive radar system, such as a blind spot detection system, and includes a base 200, a first antenna module 202, a second antenna module 204, and a control system 206. The radar device 20 may be installed inside a vehicle bumper. For example, the radar device 20 may be disposed on a bumper 22 by locking or bonding. Since the radar device 20 integrates the first antenna module 202, the second antenna module 204, and the control system 206 needed for blind spot detection, the required routing is significantly reduced and the assembly procedure is simplified.

In detail, the first antenna module 202 is fixed on the base 200, and includes a transmitting antenna TX_1 and receiving antennas RX_11, RX_12. The transmitting antenna TX_1 is used for transmitting a detection signal DET, and the receiving antennas RX_11, RX_12 are used for generating a signal receiving result RST_1. The second antenna module 204 is also fixed on the base 200, and includes a transmitting antenna TX_2 and receiving antennas RX_21, RX_22. The transmitting antenna TX_2 is used for transmitting the detection signal DET, and the receiving antennas RX_21, RX_22 are used for generating a signal receiving result RST_2. The control system 206 is disposed on the base 200 and is coupled to the first antenna module 202 and the second antenna module 204 for outputting the detection signal DET to the first transmitting antenna TX_1 and the second transmitting antenna TX_2 and processing the signal receiving results RST_1, RST_2. In short, when an obstacle exists within a detection range of the first antenna module 202, the obstacle may reflect the detection signal DET transmitted by the transmitting antenna TX_1. Then, the reflected signal is received by the receiving antennas RX_11, RX_12 to generate the signal receiving result RST_1. Consequently, the control system 206 can determine if the obstacle exists within the detection range of the first antenna module 202. Similarly, when the obstacle exists within a detection range of the second antenna module 204, the obstacle may reflect the detection signal DET transmitted by the transmitting antenna TX_2, and then the reflected signal is received by the receiving antennas RX_21, RX_22 to generate the signal receiving result RST_2. As a result, the control system 206 can determine if the obstacle exists in the detection range of the second antenna module 204. Note that, the signal receiving results RST_1, RST_2 are combinational results of RF signals received by the receiving antennas RX_11, RX_12 and the receiving antennas RX_21, RX_22, respectively. That is, the signal receiving result RST_1 includes RF receiving signals of the receiving antennas RX_11, RX_12, and the signal receiving result RST_2 includes RF receiving signals of the receiving antennas RX_21, RX_22. It is because the blind spot detection system requires two or more RF receiving signals received by the receiving antennas in order to determine related parameters of the obstacle, such as speed, direction, etc. Therefore, a signal receiving result is represented by RF receiving signals of two receiving antennas.

Figure 1:
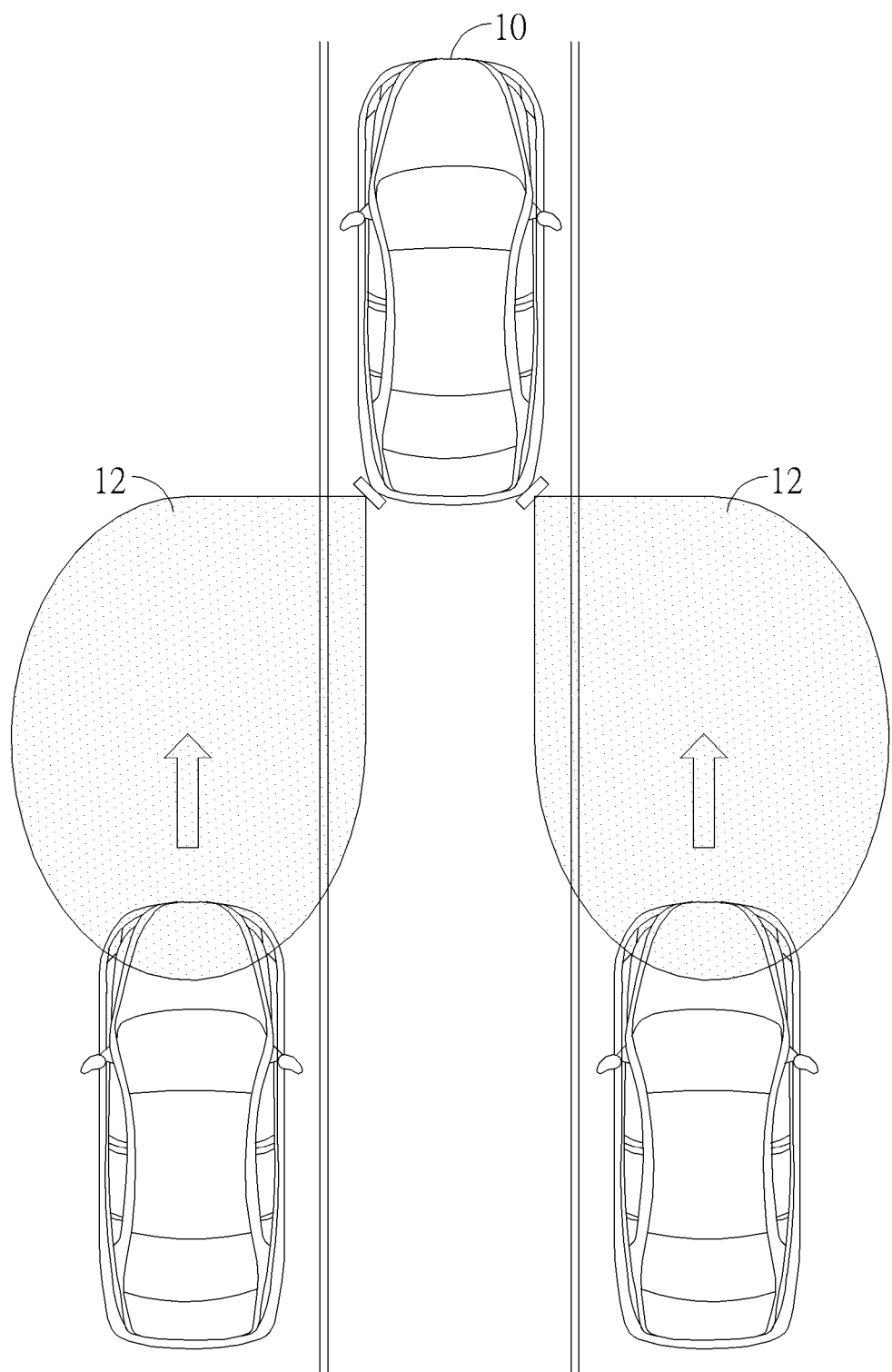
FIG. 1 is a conceptual operation diagram of a blind spot detection system according to the prior art.
Figure 2C:
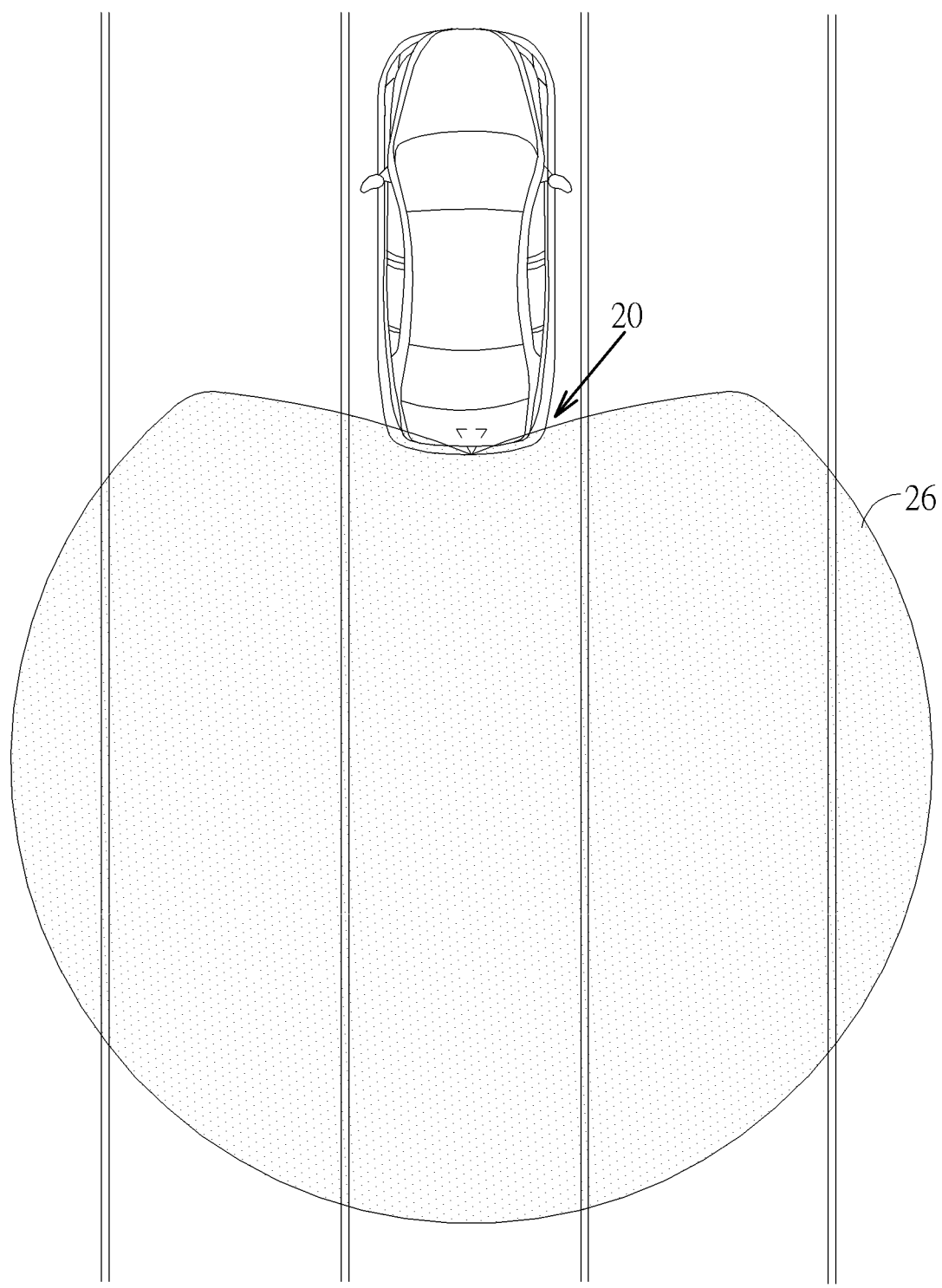
FIG. 2C is a blind spot detection range of the radar device shown in FIG. 2A.
Figure 2D:
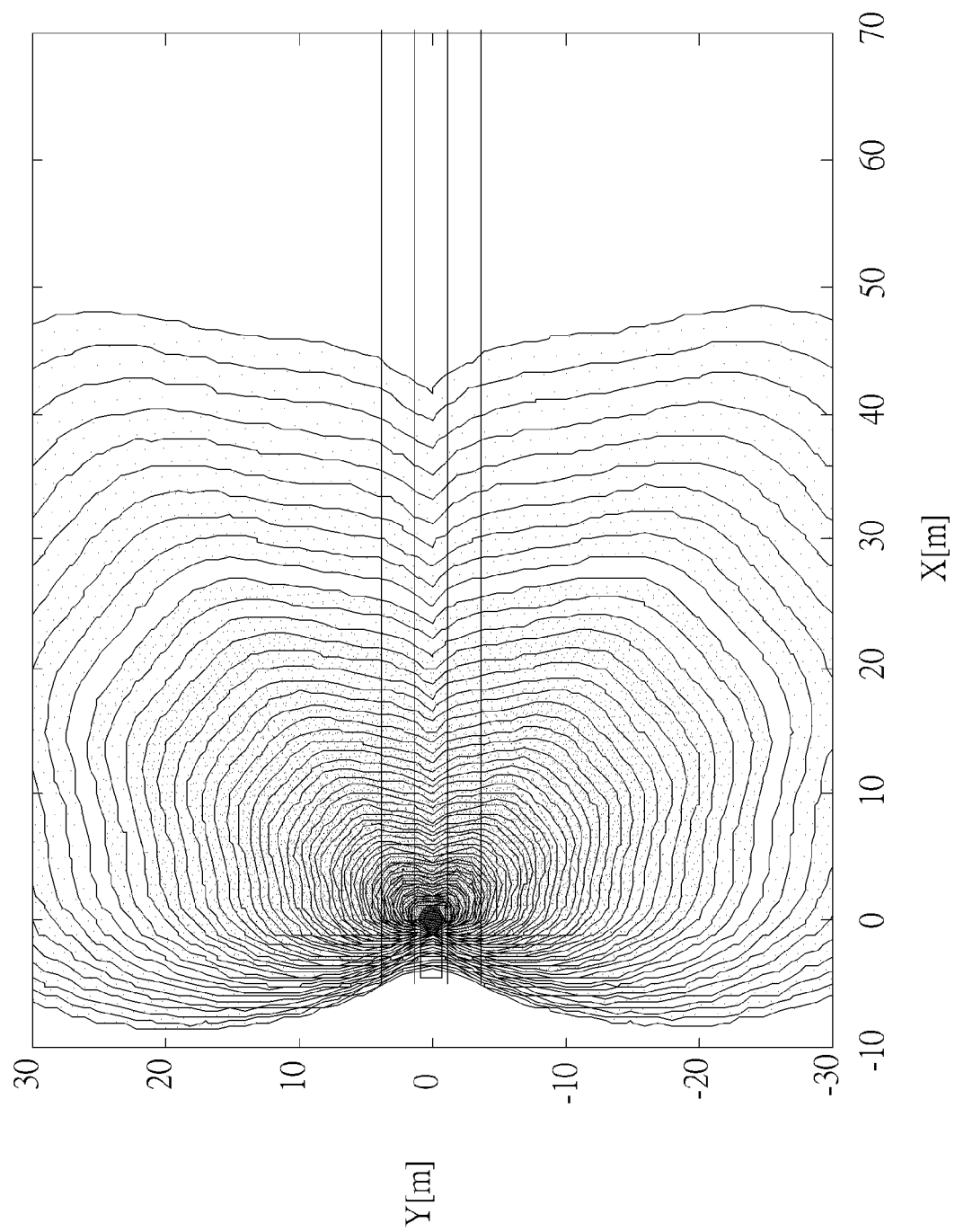
FIG. 2D is a radiation pattern of the radar device shown in FIG. 2A.

Moreover, as shown in FIG. 2A, the first antenna module 202 and the second antenna module 204 are both fixed on the base 200, and form an included angle between 30 degrees to 150 degrees. For example, if the radar device 20 is applied to a vehicle having a broader width, the included angle between the first antenna module 202 and the second antenna module 204 may be reduced. On the contrary, if the radar device 20 is applied to a vehicle having a narrower width, the included angle between the first antenna module 202 and the second antenna module 204 may be increased. The blind spot detection range of the radar device 20 is illustrated as a region 26 shown in FIG. 2C, and the associated radiation pattern is shown in FIG. 2D. As can be seen by comparing FIG. 1 with FIG. 2C, the radar device 20 can simplify the routing and the assembly procedure as well as enlarge the detection range. Therefore, the radar device 20 is suitable for blind spot detection, and can be further modified to apply for advance warning of overtaking crashes, so as to improve driving safety.

Figure 2E:
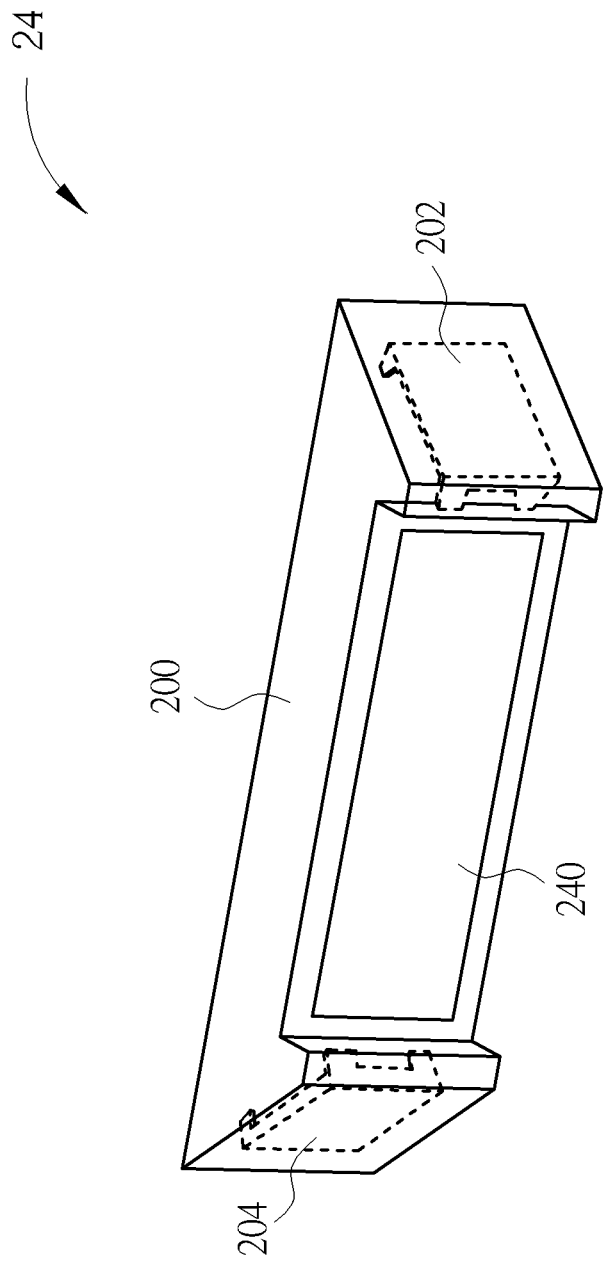
FIG. 2E is a schematic diagram of a radar device according to an embodiment of the present invention

FIGS. 2A, 2B are examples of the present invention. Those skilled in the art can make modifications or alterations accordingly. For example, in an embodiment, an angle adjustment mechanism may be added for adjusting the included angle between the first antenna module 202 and the second antenna module 204. Besides, in FIG. 2A, the top side of the first antenna module 202 and the second antenna module 204 are connected, but is not limited thereto. Namely, the first antenna module 202 and the second antenna module 204 may be separated. For example, please refer to FIG. 2E, which is a schematic diagram of a radar device 24 according to an embodiment of the present invention. The radar device 24 is similar with the radar device 20, so components with the same functionality are labeled by the same symbol. The difference between the radar device 24 and the radar device 20 is that a connection component 240 is located between the first antenna module 202 and the second antenna module 204. Nevertheless, the routing required for the radar device 24 can be reduced and the assembly procedure can be simplified as well. Noticeably, a dimension or a material of the connection component 240 may be adjusted or changed according to different applications, and is not limited herein. For example, in an embodiment, the dimension of the connection component 240 complies with a vehicle license plate, so that the radar device 24 can be disposed on the location for installing the vehicle license plate and the vehicle license plate is disposed on the connection component 240.

On the other hand, in the radar device 20, the control system 206 is utilized to control the first antenna module 202 and the second antenna module 204, but the related implementation methods thereof are not limited. For example, please refer to FIG. 3A, which is a schematic diagram of a control system 30 according to an embodiment of the present invention. The control system 30 can realize the control system 206 of the radar device 20, and includes a first RF processing module 300, a second RF processing module 302, and a computation module 304. The first RF processing module 300 and the second RF processing module 302 are coupled to the first antenna module 202 and the second antenna module 204, respectively, for complying with operations of the first antenna module 202 and the second antenna module 204. In other words, the first RF processing module 300 is used for outputting the detection signal DET to the first transmitting antenna TX_1 and processing the signal receiving result RST_1, and the second RF processing module 302 is used for outputting the detection signal DET to the second transmitting antenna TX_2 and processing the signal receiving result RST_2. The computation module 304 may be a processing unit having digital computation functions such as a microcontroller or a digital signal processor, for controlling the first RF processing module 300 and the second RF processing module 302 to generate the detection signal DET, and receiving the signal receiving results RST_1, RST_2 to determine conditions of obstacles.

Implementations of the first RF processing module 300 and the second RF processing module 302 are not limited to any specific architecture. For example, FIG. 3B is a schematic diagram of a first RF processing module 300 according to an embodiment of the present invention. The second RF processing module 302 may be realized in the same architecture as the first RF processing module 300. As shown in the FIG. 3B, the first RF processing module 300 includes a digital-to-analog converter 306, signal processing units 308, 310, a microwave transceiver 312, and equalizers 314, 316, 318. The signal processing units 308 includes an intermediate-frequency (IF) amplifier and filter module set 320, and an analog-to-digital converter 324. The signal processing units 310 includes an IF amplifier and filter module 322, and an analog-to-digital converter 326.

The operation principles for the first RF processing module 300 are illustrated as follows. As to the signal transmission operation, when the detection signal DET is transmitted via the first transmitting antenna TX_1, the computation module 304 may output a digital command (or a digital signal or packet) D_DET associated with the detection signal DET to the digital-to-analog converter 306. The digital-to-analog converter 306 may convert the digital command D_DET to an analog signal and output the analog signal to the microwave transceiver 312 for modulating and mixing (up converting) the analog signal to generate differential signals P_t, N_t. The differential signals P_t, N_t are then converted into the detection signal DET by the equalizer 314. Finally, the detection signal DET is transmitted to the air via the first transmitting antenna TX_1.

On the contrary, as to the signal receiving operation, the equalizers 316, 318 convert RF signals (i.e., the signal receiving result RST_1) received by the receiving antennas RX_11, RX_12 into differential signals P_r1, N_r1 and P_r2, N_r2, respectively. Then, the differential signals P_r1, N_r1 and P_r2, N_r2 are mixed (down converted) and demodulated into in-phase differential signals I1P, I1N, orthogonal differential signals Q1P, Q1N, in-phase differential signals I2P, I2N, and orthogonal differential signals Q2P, Q2N by the microwave transceiver 312. Next, the IF amplifier and filter module sets 320, 322 convert the differential signals outputted by the microwave transceiver 312 into an in-phase signal I1, an orthogonal differential signal Q1, an in-phase signal I2, and an orthogonal differential signal Q2. Finally, the analog-to-digital converters 324, 326 convert the in-phase signal I1, the orthogonal differential signal Q1, the in-phase signal I2, and the orthogonal differential signal Q2 into a digital in-phase signal D_I1, a digital orthogonal differential signal D_Q1, a digital in-phase signal D_I2, and a digital orthogonal differential signal D_Q2 to send the converted signals to the computation module 304. Accordingly, the computation module 304 can determine the conditions of the obstacle.

In the example shown in FIG. 3B, the microwave transceiver 312 is operated in the differential mode, so the equalizers 314, 316, 318 are required to convert the single-ended signals to the differential signals. However, in other embodiments, if the microwave transceiver 312 is operated in a single-ended mode instead of the differential mode, the equalizers 314, 316, 318 may be removed. The method of utilizing the equalizers 314, 316, 318 for conversion between single-ended and differential signals is well known to those skilled in the art. In addition, the first RF processing module 300 in FIG. 3B further converts the signal receiving result RST_1 into the in-phase and the orthogonal signals, but is not limited herein. In other embodiments, the signal receiving result RST_1 may be maintained to operate in time domain.

Figure 3A:
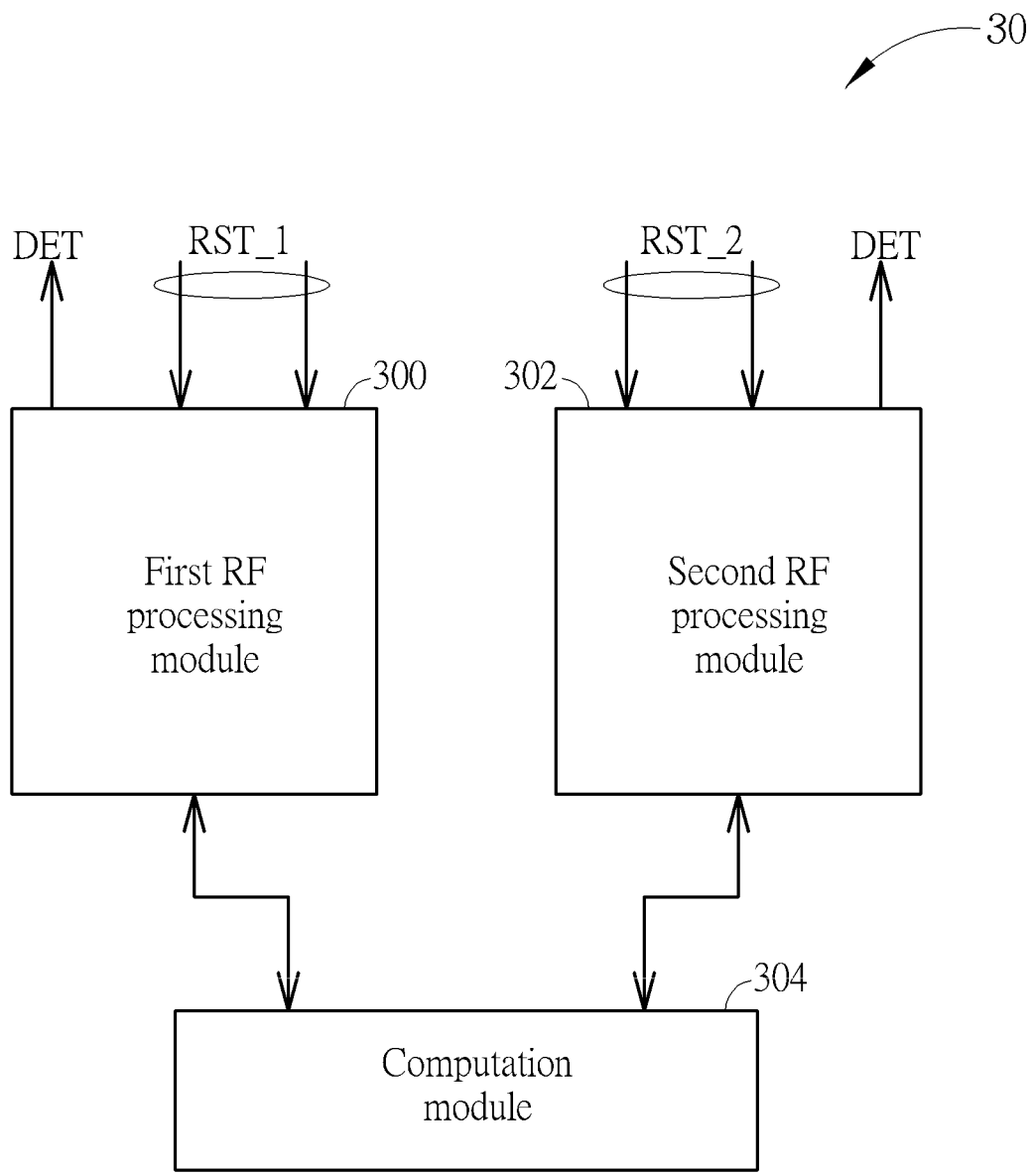
FIG. 3A is a schematic diagram of a control system according to an embodiment of the present invention.
Figure 3B:
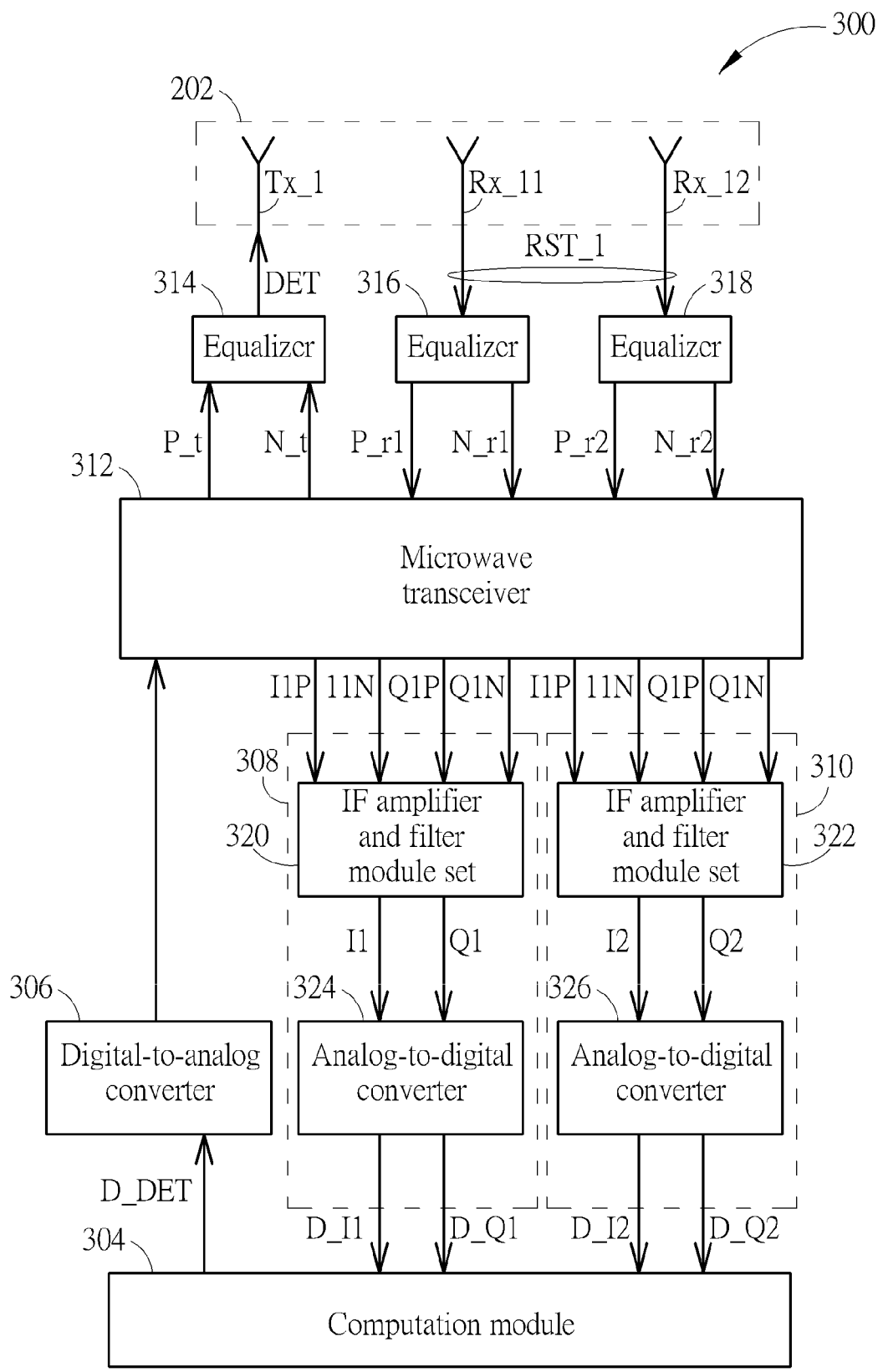
FIG. 3B is a schematic diagram of the first RF processing module shown in FIG. 3A.
Figure 4A:
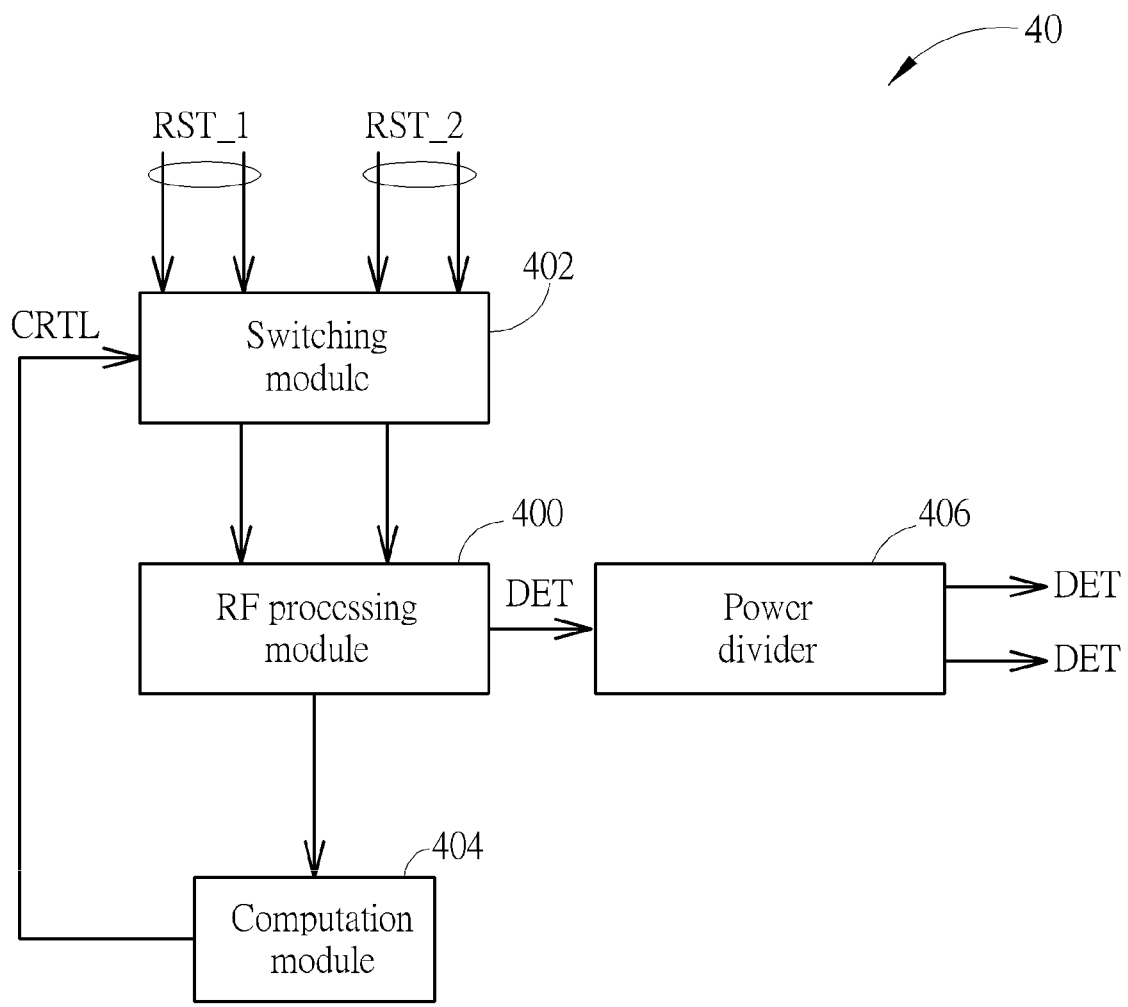
FIG. 4A is a schematic diagram of a control system according to an embodiment of the present invention.

The control system 30 in FIG. 3A utilizes two independent RF processing modules (300, 302) to process the signal receiving results RST_1, RST_2 generated by the first antenna module 202 and the second antenna module 204. In addition, the present invention also provides an embodiment for sharing the control system between the RF processing modules. Please refer to the FIG. 4A, which is a schematic diagram of a control system 40 according to an embodiment of the present invention. The control system 40 may realize the control system 206 of the radar device 20, and includes an RF processing module 400, a switching module 402, a computation module 404, and a power divider 406. The RF processing module 400 is used for outputting the detection signal DET to the power divider 406, and processing the signal receiving results RST_1, RST_2. The operation principles, architecture, and alterations of the RF processing module 400 may be the same as the first RF processing module 300 shown in FIG. 3B, so the details are omitted herein. The power divider 406 may distribute the detection signal DET to the first transmitting antenna TX_1 and the second transmitting antenna TX_2. The switching module 402 is coupled between the receiving antennas RX_11, RX_12, RX_21, RX_22 and the RF processing module 400, is used for switching the connection between the receiving antennas RX_11, RX_12, RX_21, RX_22 and the RF processing module 400. The computation module 404 may be a processing unit having digital computation functions such as a micro-controller or a digital signal processor, for controlling the RF processing module 400 to generate the detection signal DET and receiving the signal receiving result RST_1 or RST_2 sequentially to determine the conditions of obstacles.

Figure 4B:
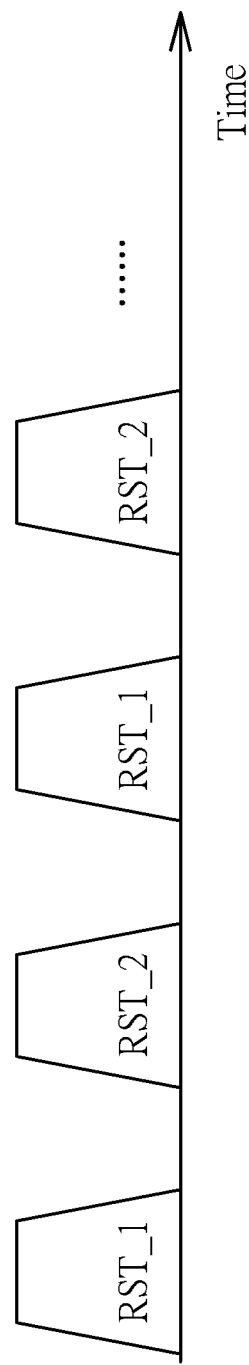
FIG. 4B is a timing diagram of the control system shown in FIG. 4A.

In detail, the computation module 404 may use a control signal CTRL to control the switching module 402 to switch between either the first antenna module 202 to output the signal receiving result RST_1 to the RF processing module 400 or the second antenna module 204 to output the signal receiving result RST_2 to the RF processing module 400, such that the RF processing module 400 and the computation module 404 can sequentially switch and process between the signal receiving results RST_1 and RST_2, as shown in a timing diagram of FIG. 4B. In other words, the first antenna module 202 and the second antenna module 204 share the same RF processing module 400 such that the manufacturing cost and the circuit area are further reduced. Note that, in FIG. 4B, the RF processing module 400 and the computation module 404 switch between the signal receiving results RST_1 and RST_2 sequentially; however, in real practice, the signal receiving results RST_1 and RST_2 may be separated by a time interval. That is, the processing of the signal receiving result RST_2 may be performed after the processing time of the signal receiving result RST_1 plus a specific time interval, and vice versa.

In FIG. 2A, the antenna device 20 uses the first antenna module 202 and the second antenna module 204 to detect the blind spot region in both corners of the rear of the vehicle. However, such architecture is only one of feasible embodiments. Appropriate derivations or modifications can be made in order to extend the antenna device 20 to other applications. For example, the blind spot region to the drivers or the operators may not be limited to two corners of the rear of a large vehicle (e.g. tractor-trailer, large bus) or specific heavy machinery (e.g. cranes, bulldozers, and excavators). In such a case, the antenna device 20 may be disposed on the front or lateral of the vehicles. Alternatively, additional radar module may be included according to the architecture of the antenna device 20. If more than one radar device 20 is disposed on different positions of a vehicle for enlarging the detection region, the operation principles mentioned previously may be adopted. However, if the amount of radar modules disposed in the antenna device 20 is increased, the control system 30 in FIG. 3A and the control system 40 in FIG. 4A may be implemented differently.

Figure 5:
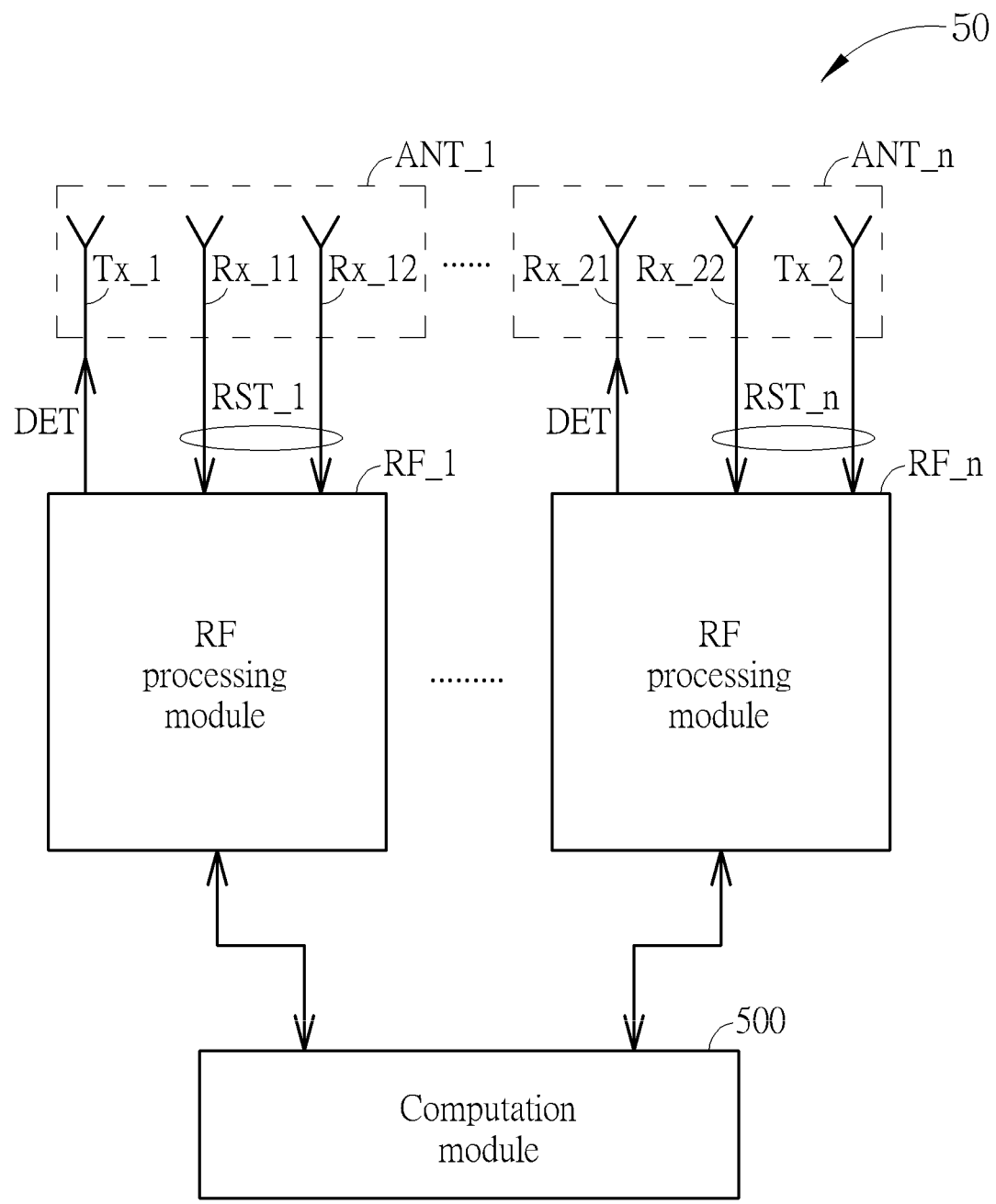
FIG. 5 is a block diagram of an antenna device according to an embodiment of the present invention.

Please refer to the FIG. 5, which is a block diagram of an antenna device 50 according to an embodiment of the present invention. The antenna device 50 may be used in an automotive radar system such as a blind spot detection system, and is derived from the antenna device 20 in FIG. 2B. Therefore, the antenna device 50 is applicable to a vehicle requiring more than two detection regions. In detail, the antenna device 50 includes antenna modules ANT_1-ANT_n, RF processing modules RF_1-RF_n, and a computation module 500. As can be seen by comparing FIG. 5 with FIG. 3A, the antenna device 50 adopts the same architecture as that of the control system 30 in FIG. 3A. Namely, the RF processing modules RF_1-RF_n independently output detection signals to the antenna modules ANT_1-ANT_n, and process the signal receiving results RST_1-RST_n generated by the antenna modules ANT_1-ANT_n respectively. Thus, the related operation and implementation methods may refer to the control system 30.

Figure 6A:
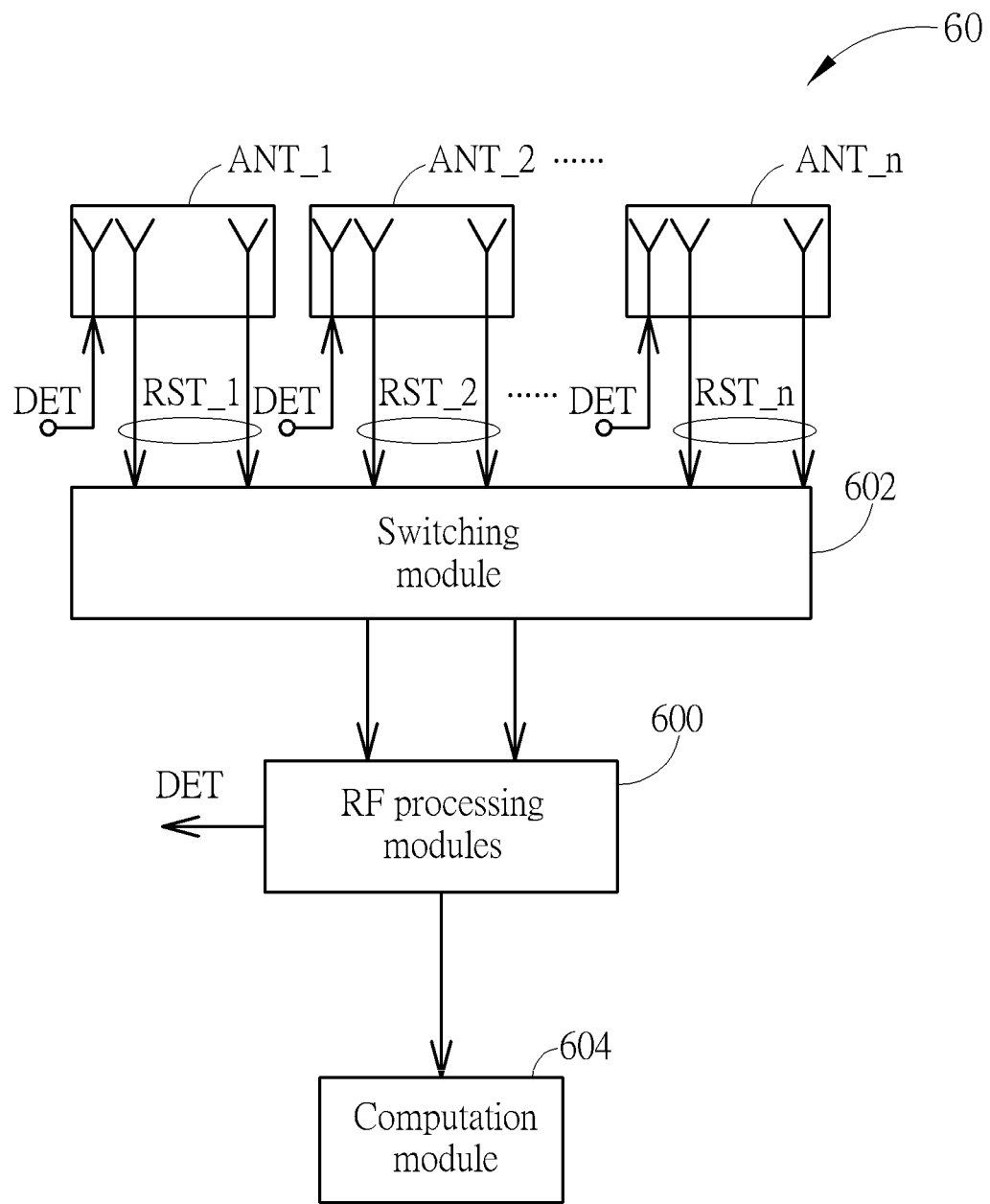
FIG. 6A is a block diagram of an antenna device according to an embodiment of the present invention.
Figure 6B:
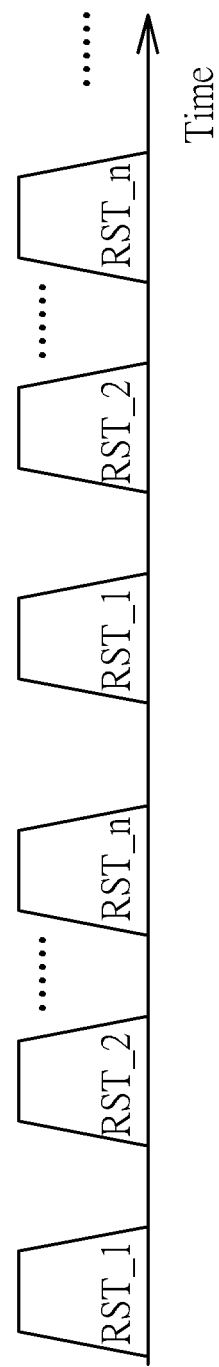
FIG. 6B is a timing diagram of the antenna device shown in FIG. 6A.

Besides, please refer to FIG. 6A, which is a block diagram of an antenna device 60 according to an embodiment of the present invention. The antenna device 60 may be used in an automotive radar system such as a blind spot detection system, and is derived from the antenna device 20 in FIG. 2B. Therefore, the antenna device 60 is applicable to a vehicle requiring more than two detection regions. In detail, the antenna device 60 includes antenna modules ANT_1-ANT_n, an RF processing modules 600, a switching module 602, and a computation module 604. As can be seen by comparing FIG. 6A with FIG. 4A, the antenna device 60 uses the same architecture as that of the control system 40 in FIG. 4A. That is, the computation module 604 controls the switching module 602 to sequentially switch the connections between the receiving antennas of the antenna modules ANT_1-ANT_n and the RF processing modules 600, such that the RF processing modules 600 sequentially processes the signal receiving results RST_1-RST_2 generated by the antenna modules ANT_1-ANT_n. Please refer to FIG. 6B for a related timing diagram. In such a condition, the antenna modules ANT_1-ANT_n share the same RF processing module 600 such that the manufacturing cost and the circuit area are further reduced. Regarding the operation principles and implementation method of the antenna device 60, please refer to descriptions related to the control system 40.

In the prior art, the wireless signal transceivers of the blind spot detection system are disposed respectively on two corners of the rear bumper of the vehicle, which results in an increased installation complexity and a higher cost, and is inadequate for sales of after-market. On the contrary, the radar device of the present invention integrates the antenna module and the control system needed for the blind spot detection, thereby significantly reducing the required routing and simplifying the assembly procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radar device for an automotive radar system comprising:
   a base, comprising a first plane and a second plane, wherein the first plane and the second plane form an included angle;
   a first antenna module, comprising a first transmitting antenna and a plurality of first receiving antennas for transmitting a detection signal and generating a first signal receiving result, wherein the first antenna module is disposed on the first plane of the base;
   a second antenna module, comprising a second transmitting antenna and a plurality of second receiving antennas for transmitting the detection signal and generating a second signal receiving result, wherein the second antenna module is disposed on the second plane of the base; and
   a control system, disposed on the base and coupled to the first antenna module and the second antenna module for outputting the detection signal to the first transmitting antenna and the second transmitting antenna and processing the first signal receiving result and the second signal receiving result, wherein the control system, the first antenna module, and the second antenna module are fixed on the base in order to be detached from or mounted on a vehicle.

2. The radar device of claim 1, wherein the included angle is between 30 degrees to 150 degrees.

3. The radar device of claim 1, wherein the base further comprises a connection component disposed between the first antenna module and the second antenna module for fixing a relative position of the first antenna module and the second antenna module.

4. The radar device of claim 3, wherein the dimension of the connection component conforms to a size of a vehicle license plate.

5. The radar device of claim 1, wherein the control system comprises:
   a radio-frequency (RF) processing module, for outputting the detection signal to the first and the second transmitting antennas and processing the first signal receiving result and the second signal receiving result;
   a switch module, coupled to the plurality of first and second receiving antennas and the RF processing module, for switching the connection between the plurality of first or second receiving antennas and the RF processing module; and
   a computation module, coupled to the RF processing module and the switch module for controlling the RF processing module to generate the detection signal to the first and second transmitting antennas, receiving the first and the second signal receiving results to determine an occurrence of a plurality of obstacles, and controlling the switch module to switch the connection sequentially such that either the first antenna module outputs the first signal receiving result to the RF processing module or the second antenna module outputs the second signal receiving result to the RF processing module.

6. The radar device of claim 5, wherein the RF processing module comprises:
  a digital-to-analog converter, coupled to the computation module for converting a control signal of the computation module to the detection signal;
  a plurality of signal processing units, coupled to the computation module and corresponding to the plurality of first receiving antennas or the plurality of second receiving antennas, for converting and outputting the first signal receiving result or the second signal receiving result to the computation module; and
  a microwave transceiver, coupled to the plurality of antenna modules, the switch module, the digital-to-analog converter, and the plurality of signal processing units, for transmitting the detection signal converted by the digital-to-analog converter to the first and the second transmitting antennas, and respectively transmitting the first and the second signal receiving results outputted by the switch module to the plurality of signal processing units.

7. The radar device of claim 6, wherein each of the plurality of signal processing units comprises:
  a filter, coupled to the microwave transceiver for filtering out noise from the first or the second signal receiving result;
  an intermediate-frequency (IF) amplifier, coupled to the filter for amplifying the first or the second signal receiving result; and
  an analog-to-digital converter, coupled to the IF amplifier and the computation module for converting the first or the second signal receiving result to a digital result and outputting the digital result to the computation module.

8. The radar device of claim 6, wherein the RF processing module further comprises a power divider, coupled to the microwave transceiver and the first and the second transmitting antennas, for distributing the detection signal to the first and the second transmitting antennas.

9. The radar device of claim 1, wherein the control system comprises:

a first radio-frequency (RF) processing module, for outputting the detection signal to the first transmitting antenna, and processing the first signal receiving result;
  a second RF processing module, for outputting the detection signal to the second transmitting antenna, and processing the second signal receiving result;
  a computation module, coupled to the first and the second RF processing modules for controlling the first and the second RF processing modules to generate the detection signal to the first and the second transmitting antennas, and receiving the first and the second signal receiving results to determine an occurrence of a plurality of obstacles.

10. The radar device of claim 9, wherein the first or the second RF processing module comprises:
  a digital-to-analog converter, coupled to the computation module for converting a control signal of the computation module to the detection signal;
  a plurality of signal processing units, each of the signal processing unit corresponding to a first receiving antenna or a second receiving antenna and coupled to the computation module, for converting and outputting the first or the second signal receiving result to the computation module; and
  a microwave transceiver, coupled to the first or the second antenna module, the digital-to-analog converter, and the plurality of signal processing units, for transmitting the detection signal converted by the digital-to-analog converter to the first or the second transmitting antenna, and transmitting the first or the second signal receiving result to the signal processing unit.

11. The radar device of claim 10, wherein each of the plurality of signal processing units comprises:
  a filter, coupled to the microwave transceiver for filtering out noise from the first or the second signal receiving result;
  an intermediate-frequency (IF) amplifier, coupled to the filter for amplifying the first or the second signal receiving result; and
  an analog-to-digital converter, coupled to the IF amplifier and the computation module for converting the first or the second signal receiving result to a digital result, and outputting the digital result to the computation module.

12. The radar device of claim 1, wherein the first and the second signal receiving results are both differential type.

* * * * *